(12) United States Patent
Piazza et al.

(10) Patent No.: US 8,382,893 B1
(45) Date of Patent: Feb. 26, 2013

(54) CEMENTITIOUS COMPOSITIONS

(75) Inventors: Matthew Piazza, Palm Beach Gardens, FL (US); Harris D. Hobby, Sandy Springs, GA (US); Edward C. Mungenast, Boca Raton, FL (US)

(73) Assignee: Carpentercrete LLC, Boynton Beach, FL (US)

( * ) Notice: Subject to any disclaimer, the term of this patent is extended or adjusted under 35 U.S.C. 154(b) by 0 days.

(21) Appl. No.: 13/416,831

(22) Filed: Mar. 9, 2012

(51) Int. Cl.
*C04B 28/00* (2006.01)
*C04B 14/06* (2006.01)
*C04B 14/38* (2006.01)
*C04B 7/00* (2006.01)
*C04B 103/00* (2006.01)

(52) U.S. Cl. ........ 106/724; 106/711; 106/719; 106/721; 106/737; 106/802; 106/803

(58) Field of Classification Search .................. 106/711, 106/721, 724, 737, 802, 719, 803
See application file for complete search history.

(56) References Cited

U.S. PATENT DOCUMENTS 7,147,706 B1 * 12/2006 Piazza ........................... 106/711

FOREIGN PATENT DOCUMENTS

WO WO2008/035221 A2 * 3/2008

OTHER PUBLICATIONS

Derwent-Acc-No: 2008-F76481, abstract of KR 769853 B1 (Oct. 2007).*

* cited by examiner

*Primary Examiner* — Anthony J Green
(74) *Attorney, Agent, or Firm* — Jack Schwartz & Associates, PLLC (57) ABSTRACT

A cementitious composition is formed from a dry mix including a quantity of cement; a quantity of silica and a plurality of fibers. The cementitious composition further includes a quantity of water and a complex admixture of cement additives. The complex admixture includes superplasticizer, shrinkage reduction agent and a non-ionic surfactant in a predetermined quantity per hundred pounds of dry mix.

14 Claims, 8 Drawing Sheets

| Order | Permutation A | Permutation B | Permutation C | Permutation D | Permutation E |
|---|---|---|---|---|---|
| First | Superplasticizer | Shrinkage Retarder | Non-ionic Surfactant | Shrinkage Retarder | Superplasticizer |
| Second | Water | Non-ionic Surfactant | Superplasticizer | Water | Non-ionic Surfactant |
| Third | Shrinkage Retarder | Water | Water | Non-ionic Surfactant | Shrinkage Retarder |
| Fourth | Non-ionic Surfactant | Superplasticizer | Shrinkage Retarder | Superplasticizer | Water |

Fig. 1A

| Order | Permutation A | Permutation B | Permutation C | Permutation D | Permutation E |
|---|---|---|---|---|---|
| First | Cement | Sand | Calcium Alumina Silicate | Fiber | Sand |
| Second | Sand | Cement | Cement | Sand | Fiber |
| Third | Calcium Alumina Silicate | Fiber | Sand | Cement | Calcium Alumina Silicate |
| Fourth | Fiber | Calcium Alumina Silicate | Fiber | Calcium Alumina Silicate | Cement |

| Order | Permutation A | Permutation B | Permutation C | Permutation D | Permutation E |
|---|---|---|---|---|---|
| First | Superplasticizer | Shrinkage Retarder | Non-ionic Surfactant | Shrinkage Retarder | Superplasticizer |
| Second | Water | Non-ionic Surfactant | Superplasticizer | Water | Non-ionic Surfactant |
| Third | Shrinkage Retarder | Water | Water | Non-ionic Surfactant | Shrinkage Retarder |
| Fourth | Non-ionic Surfactant | Superplasticizer | Shrinkage Retarder | Superplasticizer | Water |

Fig. 2A

| Order | Permutation A | Permutation B | Permutation C | Permutation D | Permutation E |
|---|---|---|---|---|---|
| First | Cement | Sand | Calcium Alumina Silicate | Fiber | Sand |
| Second | Sand | Cement | Cement | Sand | Fiber |
| Third | Calcium Alumina Silicate | Fiber | Sand | Cement | Calcium Alumina Silicate |
| Fourth | Fiber | Calcium Alumina Silicate | Fiber | Calcium Alumina Silicate | Cement |

| Order | Permutation A | Permutation B | Permutation C | Permutation D | Permutation E |
|---|---|---|---|---|---|
| First | Cement | Sand | Calcium Alumina Silicate | Fiber | Sand |
| Second | Sand | Cement | Cement | Sand | Fiber |
| Third | Calcium Alumina Silicate | Fiber | Sand | Cement | Calcium Alumina Silicate |
| Fourth | Fiber | Calcium Alumina Silicate | Fiber | Calcium Alumina Silicate | Cement |

Fig. 3A

| Order | Permutation A | Permutation B | Permutation C | Permutation D | Permutation E |
|---|---|---|---|---|---|
| First | Superplasticizer | Shrinkage Retarder | Non-ionic Surfactant | Shrinkage Retarder | Superplasticizer |
| Second | Water | Non-ionic Surfactant | Superplasticizer | Water | Non-ionic Surfactant |
| Third | Shrinkage Retarder | Water | Water | Non-ionic Surfactant | Shrinkage Retarder |
| Fourth | Non-ionic Surfactant | Superplasticizer | Shrinkage Retarder | Superplasticizer | Water |

| Order | Permutation A | Permutation B | Permutation C | Permutation D | Permutation E |
|---|---|---|---|---|---|
| First | Superplasticizer | Shrinkage Retarder | Non-ionic Surfactant | Shrinkage Retarder | Superplasticizer |
| Second | Water | Non-ionic Surfactant | Superplasticizer | Water | Non-ionic Surfactant |
| Third | Shrinkage Retarder | Water | Water | Non-ionic Surfactant | Shrinkage Retarder |
| Fourth | Non-ionic Surfactant | Superplasticizer | Shrinkage Retarder | Superplasticizer | Water |

Fig. 4A

| Order | Permutation A | Permutation B | Permutation C | Permutation D | Permutation E |
|---|---|---|---|---|---|
| First | Cement | Sand | Fiber | Fiber | Sand |
| Second | Sand | Cement | Sand | Sand | Fiber |
| Third | Calcium Alumina Silicate | Fiber | Cement | Cement | Calcium Alumina Silicate |
| Fourth | Fiber | Calcium Alumina Silicate | Calcium Alumina Silicate | Calcium Alumina Silicate | Cement |

CEMENTITIOUS COMPOSITIONS

FIELD OF THE INVENTION

The present invention is related to cementitious compositions and methods of making cementitious compositions and, more specifically, sprayable cementitious compositions.

BACKGROUND

In the early 1900's, the first method was developed for spraying cementitious materials. The method was to place the dry ingredients into a hopper and then to blow the dry material out through a hose with compressed air while injecting water at the nozzle as it was released. Since the material was sprayed using a spray "gun", the process came to be referred to as "gunite". The composition was a combination of cement, sand, and gravel aggregate. This "dry mix" process was the primary process used for spraying cementitious compositions for the first half of the $20^{th}$ Century. A drawback associated with gunite application using dry mix of cementitious material is the significant amount of ambient air contamination caused by dust particles being blown through the hose and failing to completely mix with the water injected at the nozzle. This resulted in a detrimental work environment for those applying the "gunite" requiring significant safety precautions to be undertaken to protect the workers thereby increasing the time and cost for using gunite. A further drawback is, due to the imperfect mixing of the dry materials and the water, gunite applications were typically associated with significant material waste due to less than desirable ability to stick to application surfaces, especially vertical or overhead surfaces.

An improvement was made in 1960's whereby a "wet mix" process was developed and used for application to substrate surfaces. This involves pumping previously prepared cementitious materials in a viscous state to a nozzle and introducing compressed air at the nozzle. The compressed air causes the viscous cementitious materials through the nozzle and onto a receiving surface. This wet mix process became known as "shotcrete". Shotcrete applications of cementitious materials provide two advantages over gunite applications of cementitious materials. A first advantage of shotcrete applications is the reduction in rebound which is defined as the waste of material when the applied cementitious material does not stick to the surface and falls to the floor. A second advancement over gunite is the reduction of dust generated during the application process. However, while rebound has been reduced by employing the wet mix process of shotcrete, the average application of shotcrete results in between 15% and 20% loss of material resulting in an increase in cost for applying the cementitious material as well as an increase in time required to fully coat the desired substrate.

Today, shotcrete has emerged as the only acceptable industry term to correctly describe the two types of "pneumatically applied concrete" and may be used to refer to either the wet or dry process. Both processes continue to use similar formulations which include some combination of cement, sand, and one or more types of larger aggregate such as rock, gravel, etc. Other industry advances include the use of concrete admixtures such as superplasticizers and/or water reducers and accelerators. However, due to the nature of the chemical admixtures, it is common for individual admixtures to intermix with one another prior to being incorporated into the cementitious material. Premature intermixing may result in the desired effects of the admixtures from being imparted to the cementitious material. To minimize the effects of premature intermixing, the admixtures are conventionally added at the nozzle of the gun and then mixed with the cementitious material flowing therethrough. A drawback associated with this manner of combining the cementitious materials with the respective admixtures is an imperfect mixing process resulting in a cementitious material have less than optimal properties.

Conventional cementitious compositions provide a compressive strength of substantially 4,000 PSI range and have relatively low tensile and flexural strength associated therewith. Typically, tensile strength is normally in the 500-1,000 PSI range and the flexural strength is approximately 200-700 PSI. However, with a weight of substantially 146 pounds per cubic foot, it is difficult for the material to be sprayed on and adhered to either vertical substrates or overhead substrates without using some type of mesh or wire overlay that aids in adherence of the cementitious material to the substrate. A drawback associated with using these overlays is the added cost and reduced ability of the cementitious material to bond directly to the substrate.

Thus, in view of the characteristics of shotcrete application of cementitious materials, there is a significant drawback with using such applications in mining and tunneling operations. In the mining and tunneling industry, the desire and need for safety encourages the use of wire mesh and steel framing structure to be installed before the shotcrete is sprayed onto the substrate. The result is an additional installation step that increases time, labor, and cost associated with the application.

Consequently, a need exists to provide a cementitious composition that can be applied by a sprayer which can minimize the above discussed drawbacks. A cementitious composition according to invention principles addresses the known deficiencies and drawbacks.

SUMMARY OF THE INVENTION

A cementitious composition is formed from a dry mix including a quantity of cement; a quantity of silica and a plurality of fibers. The cementitious composition further includes a quantity of water and a complex admixture of cement additives. The complex admixture includes superplasticizer, shrinkage reduction agent and a non-ionic surfactant in a predetermined quantity per hundred pounds of dry mix.

The foregoing and other features, benefits, characteristics and advantages of the present invention will become further apparent from the following detailed description of the presently preferred embodiments. The detailed description is intended to illustrate the present invention rather than to limit the scope of the present invention as defined by the appended claims and equivalents of the appended claims.

DETAILED DESCRIPTION

A cementitious composition (hereinafter "composition") advantageously achieves compressive strength, tensile strength and flexural strength that is superior to conventional cementitious compositions. In one exemplary embodiment, the composition according to invention principles provides between a 30% and 40% increase in each of compressive strength, tensile strength and flexural strength. Additionally, the composition exhibits an increased bonding affinity to the substrate on which it is applied without the need of an overlay to aid in the adhesion thereto. The composition advantageously demonstrates a lower weight per cubic foot as compare to conventional cementitious compositions. This results in the composition improving application efficiency that reduces time, labor and cost associated with applying the composition to a substrate. As used herein, the term substrate means any surface in any orientation to which the cementitious composition may be applied and bond thereto. The substrate may include at least one of (a) a cement-based surface; (b) a metallic surface; (c) a wood surface; and (d) a surface formed from an organic material (e.g. coal).

A composition according to invention principles includes a group of dry materials that are combined with a unique complex admixture that, when combined in the below discussed manner produce the cementitious according to invention principles. In one embodiment, the first group of dry materials includes cement and at least one other type of aggregate material. In this embodiment, the complex admixture includes water, at least two different commercially available cement additives and a separation compound for separating the at least two chemical additives prior to mixing thereof. The at least two chemical additives are able to impart and enhance at least one type of property to the resulting cementitious composition. Additionally, the at least two chemical additives are reactionary and, if combined without the separation compound, the at least two chemical additives would interact with one another and fail to be incorporated into the cementitious composition thereby negating any effects thereof.

In one embodiment, the complex admixture may be formed by pre-blending (mixing) at least two different commercially available cement additives. The complex admixture including the at least two cement additives is formed in a combination and proportion selected to maximize the desired characteristics of the dry mix formulation. The addition of the pre-blended chemical admixture further advantageously reduces segregation of the composition prior application ensuring optimal mixing of the respective chemical additives in the complex admixture with the group of dry materials. Thus, the resulting composition advantageously possesses high tensile strength, high flexural strength and enhanced adhesion (bonding strength) without compromising the compressive strength. Furthermore, as the composition may be formed by combining a pre-blended complex admixture with dry ingredients in the correct proportions, the result is a considerable time savings and reduction in human error associated with measuring and mixing chemical elements at the application site.

The properties and make-up of the composition advantageously allows for application of the composition directly to a substrate. In an exemplary embodiment, composition may be applied directly to the substrate without the use of structure overlays (e.g. steel cages, wire mesh) thereby allowing the composition to be used for reinforcing the walls of mines, tunnels, pipelines, culverts, other water conducting utilities and conduits of any type. In this embodiment, the weight of the composition being substantially less than the weight of conventional shotcrete increases adhesion with the substrate. Thus, the composition can be sprayed directly onto the desired substrate and form a layer having a thickness ranging between substantially 1/16 inches to substantially 5 inches (or more) without significant rebound.

An exemplary cementitious composition may include a dry mix formed from cement, silica and fibers. The composition further includes a wet mix formed from water and at least two commercially available cement additives. The wet mix is combined with the dry mix to produce the composition. In one embodiment, the at least two cement additives may be individually pre-mixed with water prior to being added to the dry mix.

In another embodiment, the additives may be pre-blended with a non-ionic surfactant forming a complex admixture prior to being added to the dry mix. The at least two cement additives may be any two of (a) a shrinkage reduction agent; (b) a superplasticizer; (c) a water reducer; and (d) an accelerant. Exemplary formulations of the complex admixture are described in Examples 1 and 2 and exemplary compositions formed from combining the complex admixture with the dry mix are described in Examples 3-8

EXAMPLE 1

For each hundred pounds (100 lbs.) of cement, silica and aggregate material (e.g. dry mix), an exemplary complex admixture may include the following elements in the following amounts, which, when combined with a predetermined amount of water, produce the composition according to invention principles:

| Chemical Additive | Quantity |
| --- | --- |
| Superplasticizer | Between 4 ounces and 14 ounces |
| Shrinkage Retarder | Between 2 ounces and 16 ounces |
| Accelerator | Between 0.5 quarts and 3 quarts |
| Non-ionic Surfactant | Between 0.1 ounces and 2 ounces |

EXAMPLE 2

For each hundred pounds (100 lbs.) of cement, silica and aggregate material (e.g. dry mix), an exemplary complex admixture may include the following elements in the following amounts, which, when combined with a predetermined amount of water, produce the composition according to invention principles:

| Chemical Additive | Quantity |
| --- | --- |
| Superplasticizer | Between 11 ounces and 20 ounces |
| Shrinkage Retarder | Between 6 ounces and 12 ounces |
| Non-ionic Surfactant | up to 0.6 ounces |

The cementitious composition producing using the complex admixture of Example 1 yields a composition that would cure or harden more quickly than a cementitious composition produced using the complex admixture of Example 2. The increase curing/hardening associated with the complex admixture in Example 1 is due to the presence of accelerant. Variation on curing and/or hardening may also depend on the specific amount of superplasticizer and/or shrinkage reduction agent utilized. A complex admixture having a higher superplasticizer content yields higher tensile and flexural strength. Additionally, a complex admixture having a lower amount of superplasticizer will require more water to be used when mixing the complex admixture with the dry mix. However, the additional water content may result in increased cracking and reduce the overall compressive strength of the resulting composition when applied to the substrate. To minimize the negative effects of additional water content in the cementitious composition, a greater amount of shrinkage reduction agent should be used to reduce cracking when the composition hardens and bonds with the substrate.

In a further embodiment, the complex admixture may include at least one further chemical additive. The at least one further chemical additive may include any of (a) a bonding agent; (b) an air entraining agent; (c) a water reducer; (d) an ionic surfactant; (e) an anti-segregation agent; (f) an accelerant; and (g) a viscosity control agent. These chemical additives are well known to those skilled in the art of creating and mixing cementitious compositions.

In a further embodiment, the at least one further chemical may be added to the complex admixture described above in Examples 1 or 2. In an embodiment, where the at least one further chemical added to the complex admixture is bonding agent, the bonding agent may be present in amounts ranging between substantially 1 oz and substantially 16 oz. In an embodiment, where the at least one further chemical added to the complex admixture is an air entrainer, the air entrainer may be present in amounts ranging between substantially 1 oz and substantially 3 oz. In an embodiment, where the at least one further chemical added to the complex admixture is viscosity control agent, the viscosity control agent may be present in amounts ranging between substantially 0.5 oz and substantially 4 oz. In an embodiment, where the at least one further chemical added to the complex admixture is anti-segregation agent, the anti-segregation agent may be present in amounts ranging between substantially 0.5 oz and substantially 4 oz. In an embodiment, where the at least one further chemical added to the complex admixture is a water reducer, the water reducer may be present in amounts ranging between substantially 2 oz and substantially 16 oz. In another embodiment, where the at least one further chemical added to the complex admixture is a water reducer, the water reducer may be used as a substitute for quantities of water. In an embodiment, where the at least one further chemical added to the complex admixture is an ionic surfactant, the ionic surfactant may be present in amounts ranging between substantially 0.1 oz and substantially 2 oz. One skilled in the art would understand that the complex admixtures of Examples 1 and 2 may include any one of these further chemicals individually or in any combination thereof.

In another embodiment, the composition may include at least one type of aggregate material. The at least one type of aggregate material may be included in specified proportions in order to affect at least one characteristic of the composition. The at least one type of aggregate material may include any of (a) metakaolin; (b) fumed microsilica; (c) limestone; (d) vermiculite; (e) calcium alumina silicate; (f) bentonite clay (available as a commercial product sold under the trade name Easy Spread); (g) perlite and a dye. The at least one characteristic affected by the at least one type of aggregate material includes at least one of (a) increased density; (b) viscosity control by increasing or decreasing the viscosity of the composition prior to setting; and (c) fire retardation.

Referring back to the dry mix used in producing the composition, any suitable cement and silica may be used. For example, suitable cement may include gray or white Portland number one (C-150) cement and suitable silica may have a grit range of between 60 and 80. Examples of suitable silica may include at least one of (a) very fine silica glass; (b) fumed silica; (c) masonry sand; (d) black beauty slag; and (e) fumed silica slurry. In one embodiment the cement and silica in the dry mix are present in a ratio of substantially 1:1. The presence of cement in the composition is high and the composition is likely to undergo shrinkage upon setting. However, the shrinkage reducer contained in the complex admixture advantageously mitigates the shrinkage effect.

The dry mix further includes fibers mixed with the cement and silica. Exemplary fibers may have a length ranging between substantially 5 millimeters and substantially 1.5 inches. In one embodiment, the fibers have a length ranging between substantially 8 millimeters and substantially 12 millimeters. The fibers may be formed from a plurality of different type of materials known to persons skilled in the art. Exemplary materials from which the fibers can be made include at least one of (a) polypropylene; (b) basalt; (c) acrylic; (d) polyethylene; (e) synthetic microfilament fibers; and (f) synthetic microfiber known to those skilled in the art may be used. The above fiber lengths and materials are described for purposes of example only. Additionally, the fibers included in one composition may be formed from a plurality of different types of materials and have varying lengths.

When producing the composition, a quantity of water is required thereby resulting in the composition having a particular water to cement ratio. The amount of water and resulting water/cement ratio of the composition may vary based on the specific selections of aggregate materials included with the cement and silica. The water/cement ratio may also be dependent on the particular chemical additives in the complex admixture (or other chemical additives added during the mixing process including but not limited to dyes). The cementitious composition may include liquid elements (e.g. chemical additives and waters) up to 4 gallons per 100 pounds of dry mix. As demonstrated Examples 3-8 below, the amount of water, or total liquids present may be less than four gallons per 100 pounds of dry mix. For example, a total amount of liquid (chemical additives and water) may be 360 ounces or 420 ounces per 100 pounds of dry mix. Additionally, the water content of the composition may be achieved by pre-blending the cement additives prior to being added to the dry mix as discussed below In order to produce the composition according to invention principles the components of the dry mix, the complex admixture (chemical additives) and water should be combined in the manner discussed below with specific reference to FIGS. 1-4. In one embodiment, the cementitious compositions may be made by pre-mixing the cement, silica and aggregate material to form the dry mix and pre-mixing the cement additives with water in a predetermined order to produce the complex admixture. The composition may be produced by combining and mixing the pre-mixed dry mix with the complex admixture to produce the cementitious composition having the desired properties.

In this embodiment, the cement, silica and aggregate materials may be mixed together in a mixing device. The mixing device may include any of (a) tumble mixer; (b) a static mixer; (c) planetary mixer; (d) a paddle mixer; or (e) a blending machine. The pre-mixed dry mix may be used immediately or stored for later user in bags, buckets, pails, and/or other containers for future use. Additionally, the pre-blended complex admixture may be immediately added to the dry mixture or stored for future use. The pre-blending of either or both of the dry mix and the complex admixture saves considerable time in the process of making cementitious compositions because the desired chemical additives are present in the desired amounts and are specifically coordinated with the elements of the dry mix to produce a composition with the desired characteristics. Specifically, pre-blending of the complex admixture and adding the complex admixture to the dry mixture immediately preceding application of the composition to a substrate results in a thoroughly mixed composition without clumps of fiber forming therein. Pre-blending also advantageously reduces human error associated with measuring and adding either the dry ingredients (cement, silica, fibers, aggregate) and/or the chemical additives at the application site and ensures consistency in the compositions that will ultimately applied over a large area of the substrate. The consistency of the characteristics of the composition (e.g. compressive strength, tensile strength, flexural strength, bonding affinity, etc) is important especially when the composition is applied over a large area that may require multiple mixing of new compositions to coat the entire area.

Various methods may be used to mix the dry mixture with the complex admixture including the chemical additives. These methods include but are not limited to using (a) a paddle mixer; (b) a tumble mixer; (c) a static mixer; (d) a planetary mixer; (e) a pan mixer; and (f) a hand mixer. The amount of time necessary to assure adequate mixing depends upon the speed and sheer capability of the mixer, the type of mixer, the size of the batch, and other considerations known and understood by those skilled in the art. Further consideration should be given to the specific additional dry ingredients included other than the cement and silica, as well as the specific cement additives and their amounts used for the specific mixture. In all instances, all of the elements (dry and wet) should be fully and evenly blended for between 5 and 15 minutes ensuring that all elements are proportionately disbursed and provide sufficient time for the chemical additives to become activated within the composition. The amount of time within the mixing range of approximately 5 and 15 minutes depends on the sheer and speed with which the dry mix and complex admixture (or individual chemical additives) are being blended. Mixing time may be affected by certain external factors. An example of an external factor is the size and type of mixer. Other exemplary external factors may include the size of the cementitious composition being mixed (e.g. batch size). Another exemplary external factor may include at least one type of environmental characteristics such as temperature, humidity and sunlight and the like. Person skilled in the art of mixing cementitious compositions would be readily able to adapt mixing times both within the above range as well as outside the above range depending on external factors present at the time the composition is being mixed.

In one embodiment, the mixing process includes an optional further activity of adding a disproportionally high volume of fibers to the cementitious composition. This is accomplished by homogenously blending fibers into the mixture using a wetting out process using at least one of water or the complex admixture to prevent prevents clumps of fibers from forming within the compositions.

Exemplary methods of mixing the components to produce the cementitious compositions are shown in FIGS. 1-4 and will be described hereinbelow with specific reference thereto.

Figure 1A:
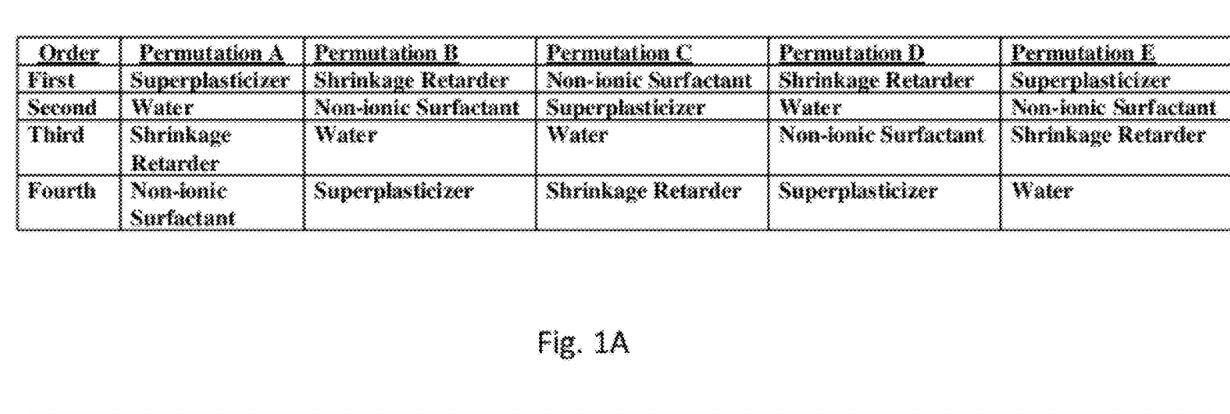
FIGS. 1A & 1B are tables detailing exemplary elements used in producing the cementitious composition according to invention principles.
Figure 1B:
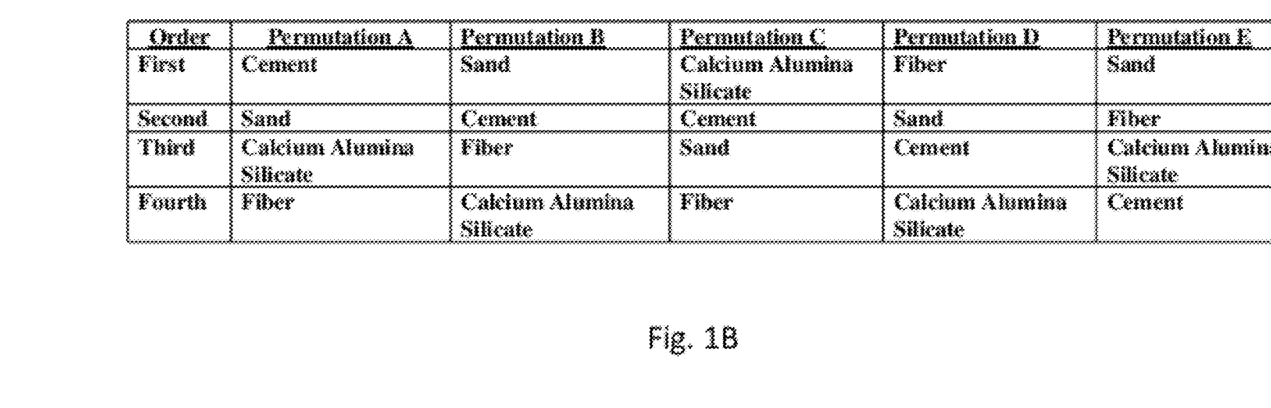
Figure 1C:
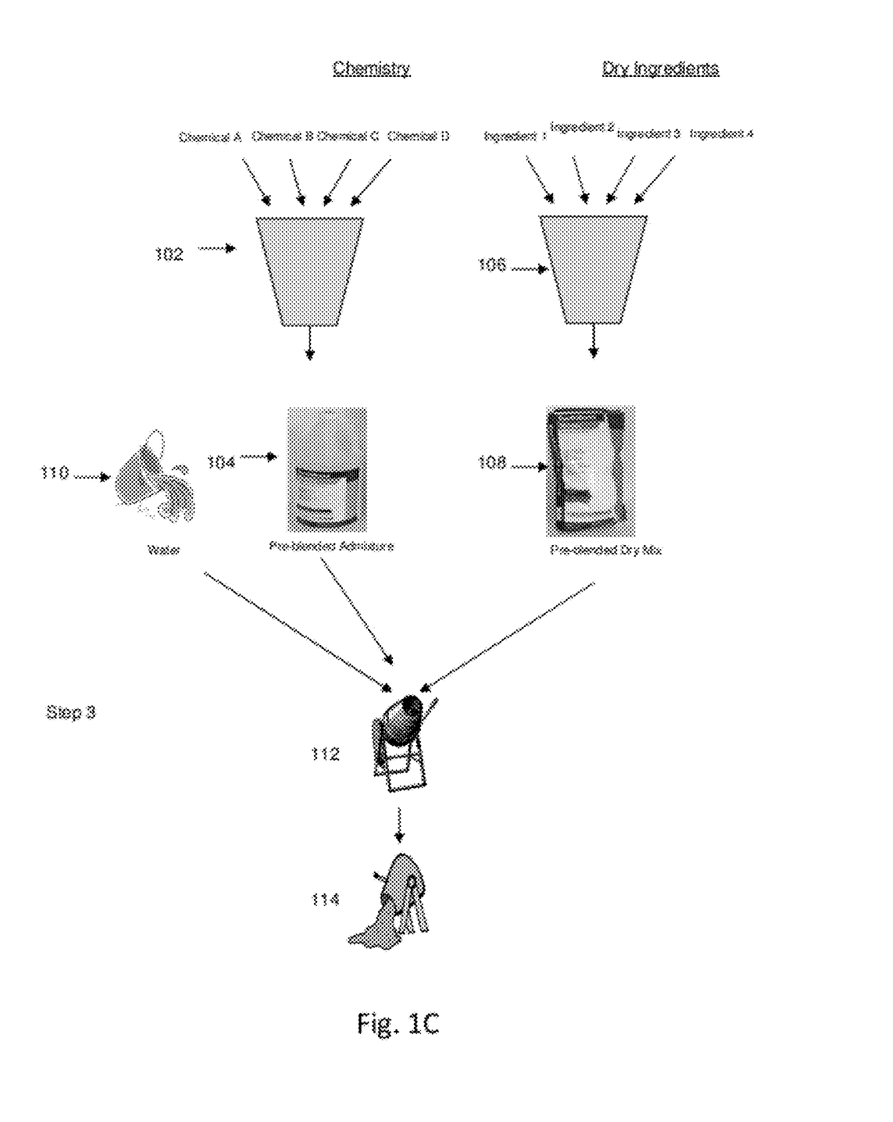
FIG. 1C depicts an exemplary process for producing the cementitious composition according to invention principles.

FIGS. 1A-1C represent a mixing process whereby chemical additives are pre-blended to produce the complex admixture and dry ingredients are also pre-blended to form the dry mixture. The composition able to be applied to the substrate is then formed by combining the complex admixture with the pre-blended dry mixture. FIG. 1A is a table shows Permutations A-E which represent five different ways to combine chemical additives to produce the complex admixture. To produce the desired complex admixture, each respective chemical additive is added in the order listed in the column labeled "Order" in order to prevent unwanted reactivity between respective chemical additives. The order in which these chemicals are added is crucial in forming a complex admixture that, when combined with the dry mix, will produce the cementitious composition having the desired characteristics described above. The chemical additives shown in FIG. 1A are shown for purposes of example only and at least one further chemical additive may be included in the complex admixture. The at least one further chemical additive would be added in a similar manner by adding a quantity of at either water or non-ionic surfactant prior to adding the at least one further chemical. This process for producing the complex admixture is shown as element 102 in FIG. 1C wherein the respective chemical additives are represented as Chemical A-D. The resulting complex admixture is represented by the container labeled 104 in FIG. 1C

FIG. 1B is a table that shows Permutations A-E representing five different ways to combine dry ingredients to produce a dry mix. Respective dry ingredients are added in the order listed in the column labeled "Order". The ingredients shown in FIG. 1B are for purposes of example only and the dry mix may include at least one other type of aggregate material added in a similar manner. This process for producing the dry mix is shown as element 106 in FIG. 1C wherein the respective ingredients are represented as Ingredient 1-4. The resulting dry mix is represented by the bag labeled 108 in FIG. 1C.

Permutations A-E in FIG. 1B correspond to Permutations A-E shown in FIG. 1A and the cementitious composition is formed by combining a respective one of the chemical additive permutations with its corresponding dry mix permutations. For example, the complex admixture of Permutation A in FIG. 1A (104 in FIG. 1C) is combined with the dry mix Permutation A (108 in FIG. 1C) and water (110 in FIG. 1C) in a mixing device (112 in FIG. 1C) to produce the cementitious composition (114 in FIG. 1C).

Referring now to FIG. 1C, once the pre-blending of the admixture 104 and the pre-blended dry mixture 108 have been completed, the admixture may be added to the mixer 112. In one embodiment, water is added to the mixing device 112 prior to adding the complex admixture 104. Alternatively, the complex admixture 104 may added into the mixer 112 prior to adding water 110 thereto. Thereafter, the dry mix 108 is added to the mixer 112 and the combination should be mixed until the desired viscosity is achieved (e.g. between 5 and 15 minutes). The desired viscosity may vary depending upon the intended use for the composition for the specific application. For example, if the composition is desired to be applied in a greater thickness, the desired viscosity may be for a less fluid or less liquid texture. If the composition needs to be pumped through the hose for greater lengths before being sprayed, this would be easier to accomplish if the composition is a "thinner" in body. In some instances, additional water 110 may be added during the mixing process in response to certain environmental characteristics including but not limited to humidity, temperature and sunlight.

Figure 2A:
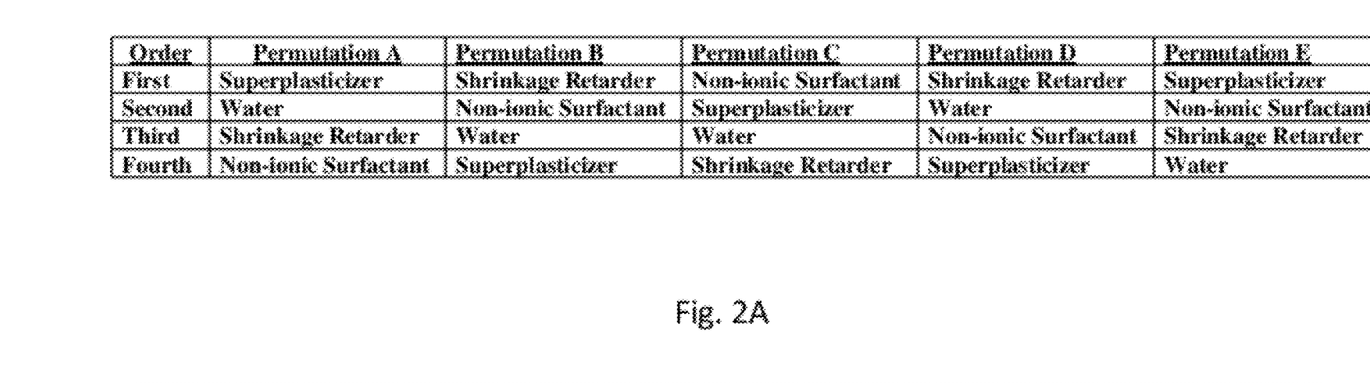
FIGS. 2A & 2B are tables detailing exemplary elements used in producing the cementitious composition according to invention principles.
Figure 2B:
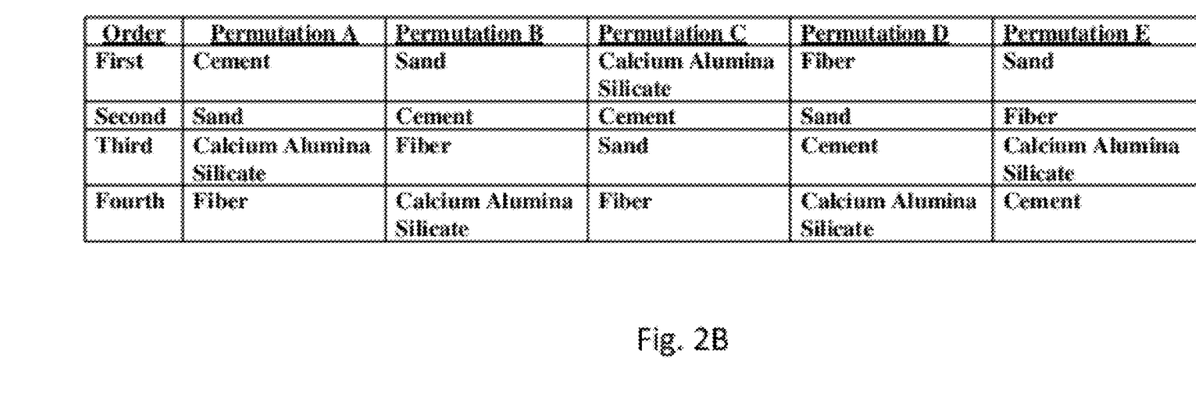
Figure 2C:
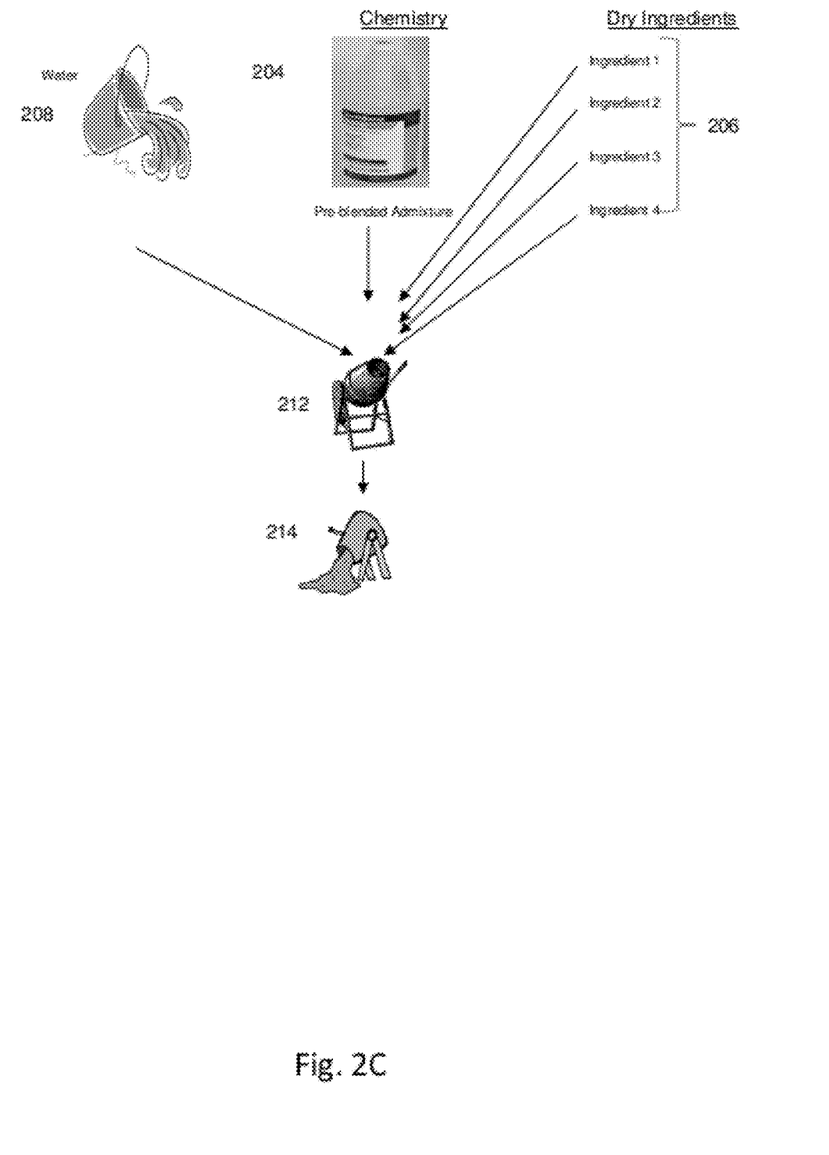
FIG. 2C depicts an exemplary process for producing the cementitious composition according to invention principles.

FIGS. 2A-2C represent a mixing process whereby chemical additives are pre-blended to produce the complex admixture and individual dry ingredients are added to a mixing device to produce the cementitious composition. FIG. 2A is a table showing Permutations A-E representing five different ways to combine chemical additives to produce the complex admixture. To produce the desired complex admixture, each respective chemical additive is added in the order listed in the column labeled "Order" in order to prevent unwanted reactivity between respective chemical additives. The order in which these chemicals are added is crucial in forming a complex admixture that, when combined with the dry mix, will produce the cementitious composition having the desired characteristics described above. The chemical additives shown in FIG. 2A are shown for purposes of example only and at least one further chemical additive may be included in the complex admixture. The at least one further chemical additive would be added in a similar manner by adding a quantity of at either water or non-ionic surfactant prior to adding the at least one further chemical. This process for producing the complex admixture is similar to the process labeled 102 in FIG. 1C and thus is not shown in FIG. 2C. However, the resulting complex admixture is represented by the container labeled 204 in FIG. 2C FIG. 2B is a table that shows Permutations A-E representing five different ways dry ingredients may be added to a mixing device as will be discussed below with respect to FIG. 2C. Respective dry ingredients are added in the order listed in the column labeled "Order". The ingredients shown in FIG. 2B are for purposes of example only and the dry mix may include at least one other type of aggregate material added in a similar manner. This process of adding respective dry ingredients to a mixing device (212 in FIG. 2C) is shown as element 206 in FIG. 1C wherein the respective ingredients are represented as Ingredient 1-4.

Permutations A-E in FIG. 2B correspond to Permutations A-E shown in FIG. 2A and the cementitious composition is formed by combining a respective one of the chemical additive permutations with its corresponding dry mix permutations. For example, the complex admixture of Permutation A in FIG. 2A (204 in FIG. 2C) is combined with the respective dry ingredients of Permutation A (206 in FIG. 2C) and water (208 in FIG. 2C) in a mixing device (212 in FIG. 1C) to produce the cementitious composition (214 in FIG. 1C).

Referring now to FIG. 2C, water 208 is added to the mixer 212 followed by the complex admixture 204. Thereafter, respective dry ingredients are added in the order specified by the particular permutation in FIG. 2B that corresponds to the permutation of the complex admixture from FIG. 2A. During the activity of adding the respective dry ingredients, the mixer 212 should be agitated to prevent clumping. The combination should mixed until the desired viscosity is achieved. In some instances, additional water 110 may be added during the mixing process in response to certain environmental characteristics including but not limited to humidity, temperature and sunlight.

Figure 3A:
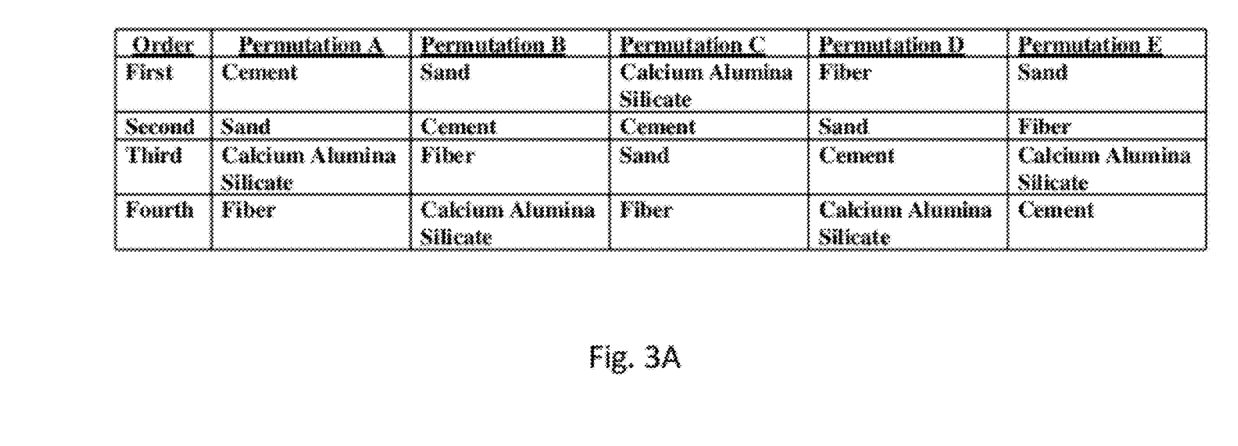
FIGS. 3A & 3B are tables detailing an exemplary elements used in producing the cementitious composition according to invention principles.
Figure 3B:
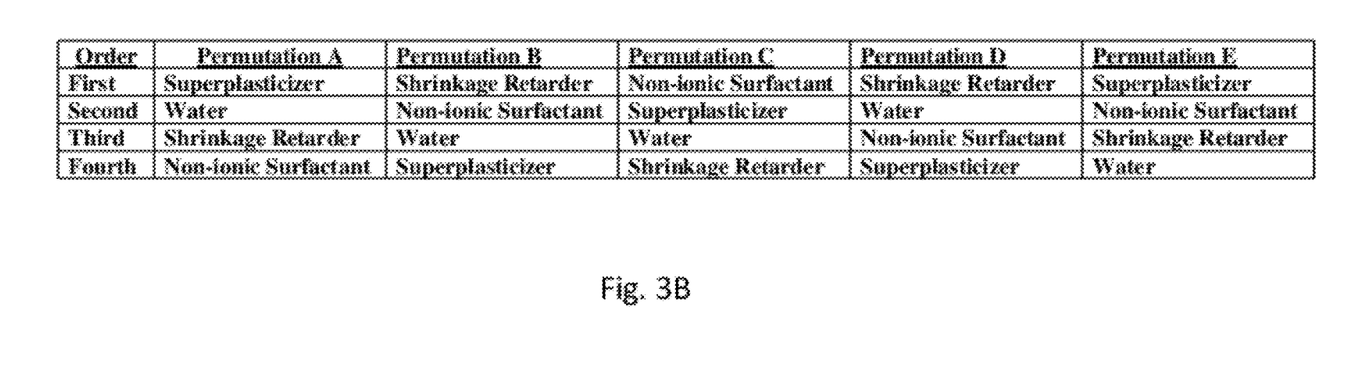
Figure 3C:
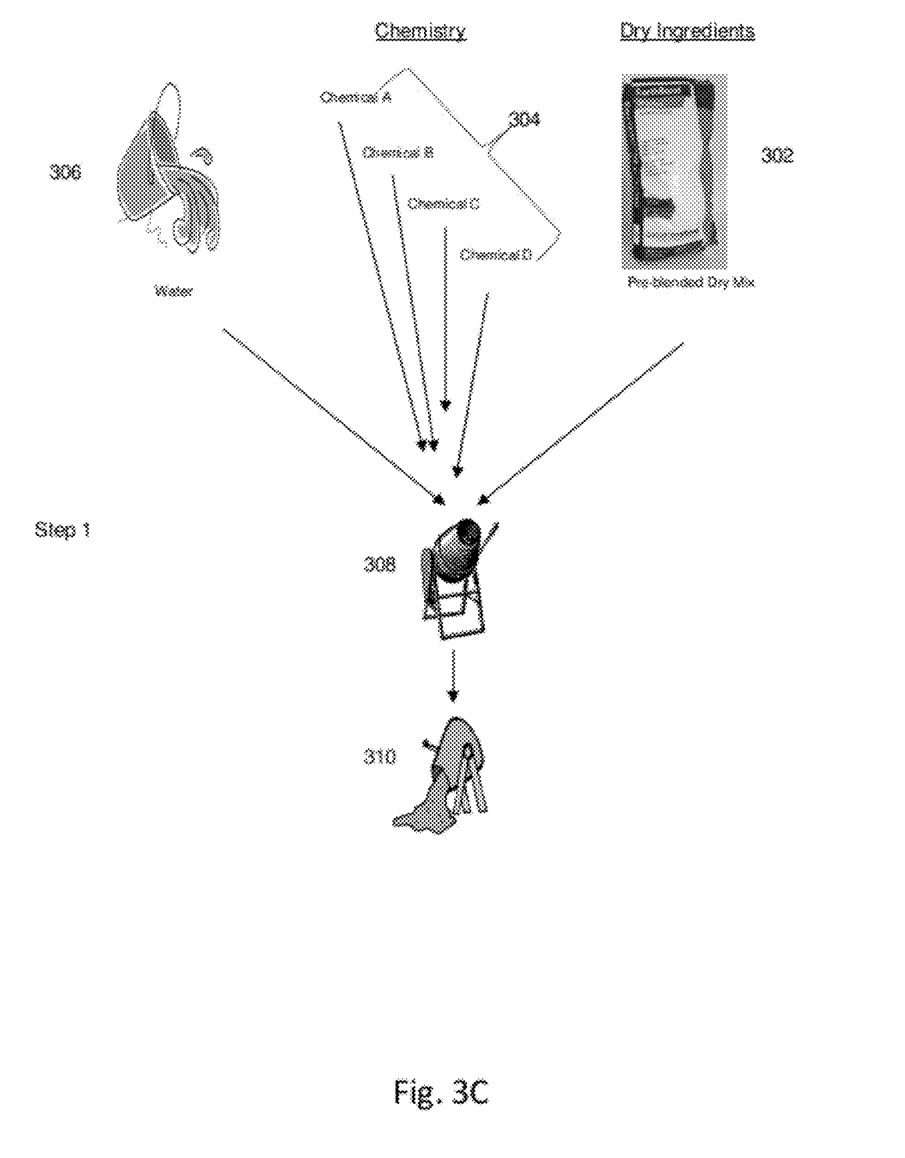
FIG. 3C depicts an exemplary process for producing the cementitious composition according to invention principles.

FIGS. 3A-3C represent a mixing process whereby respective dry ingredients are pre-blended to produce a dry mix and respective chemical additives added to a mixing device to produce the cementitious composition. FIG. 2A is a table that shows Permutations A-E representing five different ways to combine dry ingredients to produce a dry mix. Respective dry ingredients are added in the order listed in the column labeled "Order". The ingredients shown in FIG. 3B are for purposes of example only and the dry mix may include at least one other type of aggregate material added in a similar manner. This process for producing the dry mix is similar to the process labeled 106 in FIG. 1C and thus is not shown in FIG. 3C. However, the resulting dry mix is represented by the bag labeled 302 in FIG. 3C.

FIG. 3B is a table showing Permutations A-E representing five different ways to add chemical additives to a mixing device to produce the cementitious composition. Each respective chemical additive is added to the mixing device in the order listed in the column labeled "Order" in order to prevent unwanted reactivity between respective chemical additives. The order in which these chemicals are added is crucial to ensure proper mixing with the dry mix in the mixing device. The chemical additives shown in FIG. 3A are shown for purposes of example only and at least one further chemical additive may be added into the mixing device for combination with the dry mix. The at least one further chemical additive would be added in a similar manner by adding a quantity of at either water or non-ionic surfactant prior to adding the at least one further chemical to the mixing device. This process for adding respective chemical additives to the mixing device is represented by reference numeral 304 in FIG. 3C.

Permutations A-E in FIG. 3A correspond to Permutations A-E shown in FIG. 3B and the cementitious composition is formed by combining a respective one of the chemical additive permutations with its corresponding dry mix permutations.

Referring now to FIG. 3C, water 306 is added to the mixer 308 followed by the respective chemical additives in the specified order 304. Thereafter, the dry mix 302 is added to the mixer 306. The combination should be mixed until the desired viscosity is achieved and the cementitious composition 310 is produced. In some instances, additional water 110 may be added during the mixing process in response to certain environmental characteristics including but not limited to humidity, temperature and sunlight.

Figure 4A:
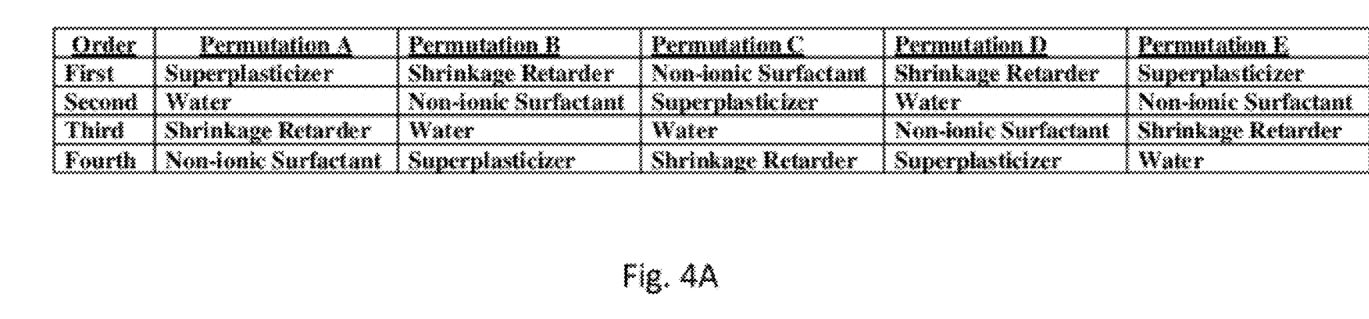
FIGS. 4A & 4B are tables detailing exemplary elements used in producing the cementitious composition according to invention principles.
Figure 4B:
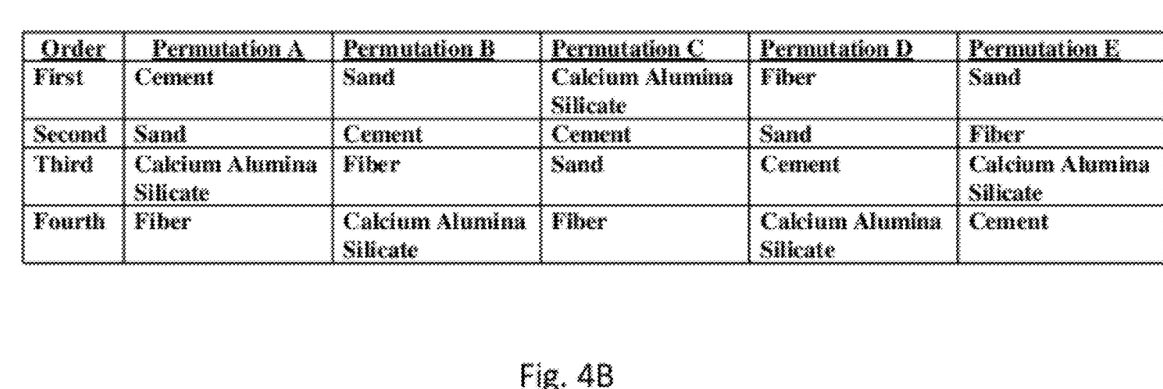
Figure 4C:
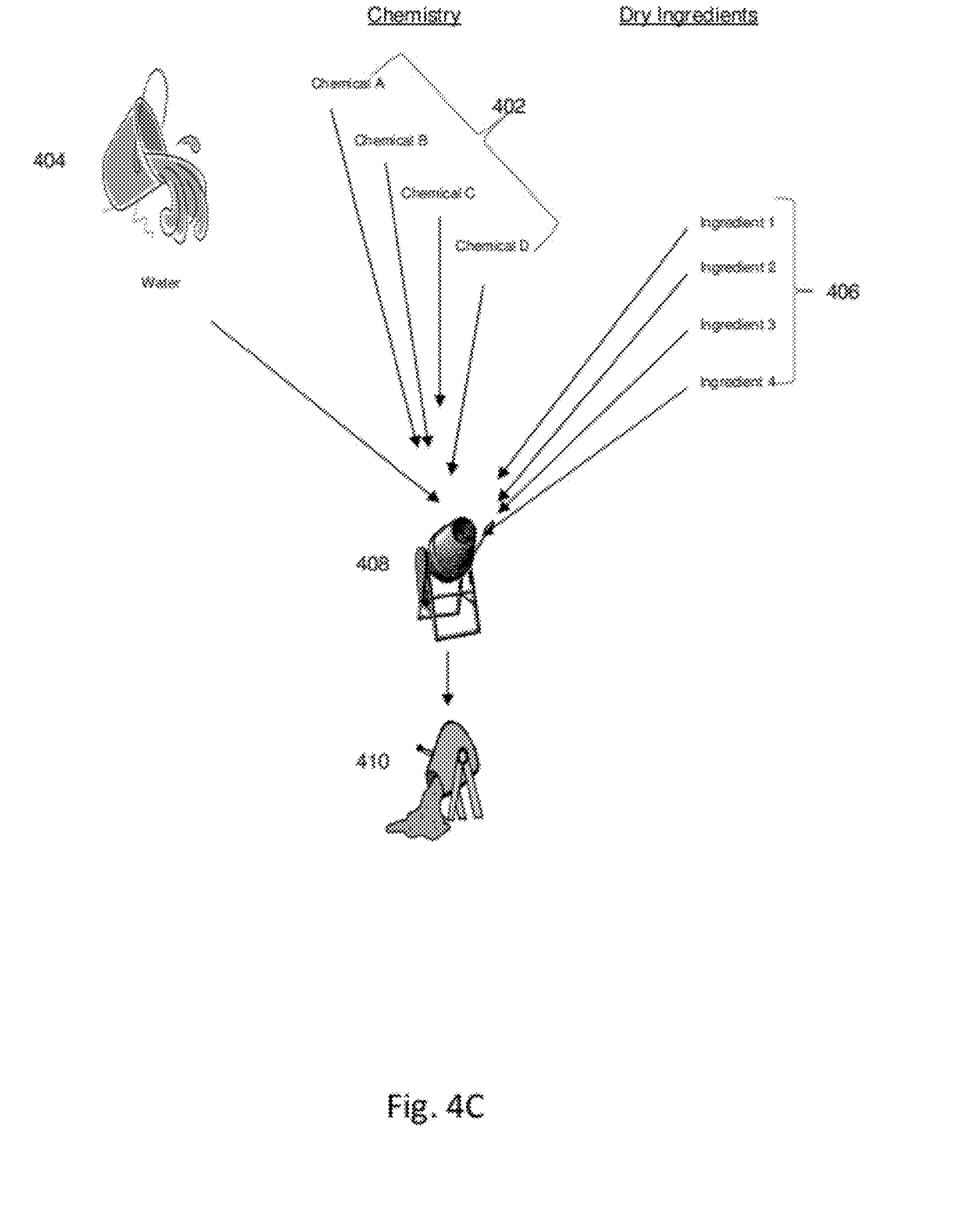
FIG. 4C depicts an exemplary process for producing the cementitious composition according to invention principles.

FIGS. 4A-4C represent a mixing process whereby respective chemical additives and respective dry ingredients are added directly into a mixing device for producing a cementitious composition able to be applied to a substrate. FIG. 4A is a table shows Permutations A-E representing five different ways in which respective chemical additives may be added to a mixing device. Each respective chemical additive is added in the order listed in the column labeled "Order" in order to prevent unwanted reactivity between respective chemical additives. The order in which these chemicals are added is crucial in forming a complex admixture that, when combined with the dry mix, will produce the cementitious composition having the desired characteristics described above. The chemical additives shown in FIG. 4A are shown for purposes of example only and at least one further chemical additive may be included in the complex admixture. The at least one further chemical additive would be added to the mixing device in a similar manner by adding a quantity of at either water or non-ionic surfactant prior to adding the at least one further chemical to the mixing device. This process for adding respective chemical additives to a mixing device is shown as element 402 in FIG. 4C wherein the respective chemical additives are represented as Chemical A-D.

FIG. 4B is a table that shows Permutations A-E representing five different ways dry ingredients may be added to a mixing device as will be discussed below with respect to FIG. 4C. Respective dry ingredients are added in the order listed in the column labeled "Order". The ingredients shown in FIG. 4B are for purposes of example only and the dry mix may include at least one other type of aggregate material added in a similar manner. This process of adding respective dry ingredients to a mixing device (408 in FIG. 4C) is shown as element 406 in Figure $C wherein the respective ingredients are represented as Ingredient 1-4.

Permutations A-E in FIG. 4B correspond to Permutations A-E shown in FIG. 4A and the cementitious composition is formed by combining a respective one of the chemical additive permutations with its corresponding dry mix permutations. For example, the chemical additives in Permutation A in FIG. 4A (402 in FIG. 4C) is combined with the dry ingredients of Permutation A in FIG. 4B (406 in FIG. 4C) and water (404 in FIG. 4C) in a mixing device (408 in FIG. 1C) to produce the cementitious composition (410 in FIG. 1C).

Referring now to FIG. 4C, water 404 is added to the mixer 408 followed by the respective chemical additives in the specified order 402. Thereafter, the respective dry ingredients are added in the specified order 406 to the mixer 408. The combination should be mixed until the desired viscosity is achieved and the cementitious composition 310 is produced. In some instances, additional water 110 may be added during the mixing process in response to certain environmental characteristics including but not limited to humidity, temperature and sunlight.

The cementitious composition produced in accordance with any of the methods described above with respect to FIGS. 1-4 produces a material that has bonding strength superior to Shotcrete and gunite, as well as a higher tensile, flexural and compressive strength. Further, the composition accomplishes these benefits using commercially available non-toxic, non-hazardous chemicals without the use of epoxies, acrylics, latex, or co-polymers. Moreover, the composition is not flammable and there is significantly less rebound than produced by dry or wet Shotcrete formulations. The composition also has a much longer pot life than conventionally available competitive products. Pot life refers to a length of time during which the cementitious composition may remain in its blended form prior to use or application to a substrate. Should the composition remain in the pot longer than it's noted pot life, composition will begin to thicken, harden and become increasingly difficult to use or even become unusable for the above discussed purposes and applications. Furthermore, the present composition produces much less dust in the air than traditional dry mix Shotcrete.

In support of the improved characteristics associated with the cementitious composition, certain tests conventionally used to measure and quantify the characteristics of cement-based materials were employed. The tests used a plurality of different standards used by the American Society for Testing and Materials (ASTM). ATSM standards provide test methods, specification, guides and practices which are used to provide industry consensus enabling certain product characteristics to be quantified, measured and compared to one another. The cementitious material including the dry mix and the chemical additives (either individually or in the form of a complex admixture) were tested to show the compressive strength; tensile strength, flexural strength and bonding strength thereof. All tests were performed with strict adherence to the methods and procedures set forth by ASTM protocols. The results are shown in Tables 1-4 below:

TABLE 1

| ASTM C-109 for Compressive Strength | |
|---|---|
| Measured Value in psi and Megapascals | Testing Period |
| 1,433 psi (9.88 Mpa) | 24 hours (post setting) |
| 3,566 psi (24.59 Mpa) | 3 days |
| 5,400 psi (37.9 Mpa) | 7 days |
| 7,331 psi (51 Mpa) | 28 days |

As can be seen from Table 1, once the cementitious composition is applied to the substrate and adheres thereto, the compressive strength of the cementitious composition increases substantially. Thus, the cementitious composition described above and produced in accordance with any of the methods described in FIG. 1-4 results in a cementitious composition having a compressive strength substantially greater than conventionally available shotcrete compositions which have a maximum compressive strength of substantially 4000 psi after twenty eight days.

TABLE 2

| ASTM C-1583 Tensile Strength | |
|---|---|
| Measured Value in psi and Megapascals | Testing Period |
| 3,071 psi (21.17 Mpa) | 7 days |

The result of the tensile strength tests shows a similar to result as the test for compressive strength as compared to conventionally available shotcrete compositions. The tensile strength of the cementitious composition described above and produced in accordance with any of the methods described above with respect to FIG. 1-4 was 3071 psi. The ASTM protocols were unable to be performed on the cementitious composition at the 14 and 28 day marks because the substrate broke each time the protocols were employed at the 14 day mark. Six attempts to perform the protocols of ATSM C-1583 were made at the 14 day mark and each time the substrate broke. The cause of substrate failure was determined to be directly related to the adherence of the cementitious composition to the substrate. The adherence of the cementitious composition was so great that the forces required in ATSM C-1583 to be exerted on the cementitious composition caused the substrate to fail without the cementitious composition delaminating from the substrate showing a superior ability to bond to substrates when compared to conventionally available shotcrete mixtures. However, in view of the significant tensile strength demonstrated at 7 days, and the fact that tensile strength of a cementitious composition only increases as the composition is allowed to harden and cure, one skilled in the art would appreciate that the tensile strength exhibited at 14 and/or 28 days would be significantly higher than the 3071 psi exhibited on day 7.

TABLE 3

| ASTM C-321 for Bond Strength | |
|---|---|
| Measured Value in psi and Megapascals | Testing Period |
| 188 psi (1.3 Mpa) | 7 days |

The results of the bond strength tests showed that the bond strength of the cementitious composition after application to a substrate was 188 psi after 7 days. However, similarly to the test performed for tensile strength, the ASTM protocols to determining bonding strength were unable to be performed on the cementitious composition at the 14 and 28 day marks because the substrate broke each time the protocols were employed at the 14 day mark. Six attempts to perform the protocols of ATSM C-321 were made at the 14 day mark and each time the substrate broke. The cause of substrate failure was determined to be directly related to the adherence of the cementitious composition to the substrate. The adherence of the cementitious composition was so great that the forces required in ATSM C-321 to be exerted on the cementitious composition caused the substrate to fail without the cementitious composition delaminating from the substrate. This shows a superior ability to bond to substrates when compared to conventionally available shotcrete mixtures. However, in view of the significant bond strength demonstrated at 7 days, and the fact that bond strength of a cementitious composition only increases as the composition is allowed to harden and cure, one skilled in the art would appreciate that the bond strength exhibited at 14 and/or 28 days would be significantly higher than the 188 psi exhibited on day 7.

TABLE 4

ASTM C-348 for Flexural strength

| Measured Value in psi and Megapascals | Testing Period |
|---|---|
| 1,015 psi (7MPa) | 7 days |

The results of the flexural strength tests showed that the flexural strength of the cementitious composition after application to a substrate was 1015 psi after 7 days. However, similarly to the test performed for tensile strength and bond strength, the ASTM protocols to determining flexural strength were unable to be performed on the cementitious composition at the 14 and 28 day marks because the substrate broke each time the protocols were employed at the 14 day mark. Six attempts to perform the protocols of ATSM C-348 were made at the 14 day mark and each time the substrate broke. The cause of substrate failure was determined to be directly related to the adherence of the cementitious composition to the substrate. The adherence of the cementitious composition was so great that the forces required in ATSM C-348 to be exerted on the cementitious composition caused the substrate to fail without the cementitious composition delaminating from the substrate. This shows a superior ability to bond to substrates when compared to conventionally available shotcrete mixtures. However, in view of the significant flexural strength demonstrated at 7 days, and the fact that flexural strength of a cementitious composition only increases as the composition is allowed to harden and cure, one skilled in the art would appreciate that the flexural strength exhibited at 14 and/or 28 days would be significantly higher than the 1015 psi exhibited on day 7.

For purposes of comparison and to place the results shown in Tables 1-4 in context, Table 5 shows a side by side comparison of conventionally available shotcrete formulations and the cementitious composition according to invention principles. In order to fully understand the values in Table 5, it is important to note that wet mix Shotcrete such as those labeled Products A-C in Table 5 is a formulation of cement, sand, and coarse aggregate. While formulations may vary, general guidelines and industry practices requires a ratio of aggregate to cement in Products A-C to range from substantially 3.5-5.0 to 1. These formulations of Products A-C may also combine sand with at least one other type of coarse aggregate material. While the above ratio of 3.5-5:1 is maintained in these formulations, the amount of coarse aggregate normally ranges between 20-33% of the total aggregate weight. The total aggregate materials of Products A-C may also include fibers resulting in a product known as Fiber Reinforced Shotcrete (FRC). In these formulations, an amount of fiber included ranges between 0.5-3.0% of the total weight of the aggregate material.

According to the American Shotcrete Organization, the formulations shown in Table 5 for Products A-C are for wet mix Shotcrete and have compressive strength of approximately 4,000 PSI. Moreover, according to the American Cement Institute, a level of rebound (e.g. the amount of material the does not adhere during application to substrate-waste) associated with wet mix Shotcrete (Products A-C in Table 5) is considered acceptable when in a range of 10% to 20% of total material applied to the substrate. (Incidentally, the acceptable rebound level associated with dry mix gunite application is within 20% to 30% range of total material applied to the substrate).

Thus, Table 5 clearly shows that the cementitious composition according to invention principles possesses superior levels for each characteristic that is typically used when judging and/or rating cement-based materials.

TABLE 5

Product Comparisons
(Product A: Tunnel Guard; Product B: Tekflex;
Product C: BASF (Wetcrete w/Fiber)

| Characteristics | Product A | Product B | Product C | Invention |
|---|---|---|---|---|
| Rebound | 15-20% | 15-20% | 20-25% | 5% |
| Primary Activating Composition | Epoxy resin | Polymer latex | Not available | No resins, co-polymers, latex or acrylics |
| Pot Life | 20 minutes | 30 minutes | Not available | 45-60 minutes |
| Coverage/Yield per 25 kgs | 3 SM at 3-4 mm | 6.5 SM at 3 mm | Not available | 4.7 SM at 3 mm |
| Compressive PSI - 28 days | 4,713 | 456 | 4,500 | 7,331 |
| Tensile PSI | 1,129 | 725 | 507 | 3,071 |
| Flexural PSI | 624 | 245 | Not available | 1,015 |
| Bond Strength PSI | 543 | 435 | 246 | 3,100 |

Therefore, as can be seen above in Table 5, the cementitious composition described above and produced in accordance with any method shown in any of FIGS. 1-4, shows a reduced rebound level (5%) which advantageously reduces the overall time and cost associated with applying the cementitious composition to a substrate. Additionally, the cementitious composition does not require the use of environmentally unfriendly activating compositions. The pot life of the cementitious composition is at least double when compared to Products A-C. The increased pot life reduces the need of persons applying the composition to a substrate to rush and potentially compromise safety because the cementitious composition remains viable longer than the conventional shotcrete mixtures of Products A-C. Moreover, the coverage yield afforded by the cementitious composition according to invention principles is increased which may be due to the decreased rebound levels providing additional material for application to the substrate. Furthermore, as discussed above, the compressive strength, tensile strength, flexural strength and bond strength of the cementitious composition according to invention principles is far superior than any of Products A-C.

The composition produced in accordance with any of the methods discussed above with respect to FIGS. 1-4 will be a cementitious composition having high compressive strength, tensile and flexural strength and which weighs less than conventionally produced cementitious materials. The composition may be applied to a substrate in any known manner. In one embodiment, the cementitious composition is applied to a substrate via a sprayed technique. While applying cementitious materials via spray applications is known in the art, certain steps should be taken to ensure optimal application of the cementitious material to the substrate. One such step is to prime the spray equipment, the hose and nozzle with a commercially available slicking agent. Exemplary slicking agents are sold under the trade name Easy Spred which is a powdered form of bentonite clay. or Slick Willie. In such circumstances, the instructions of the manufacturer should be followed minimize potential friction in the hose thereby enabling the cementitious composition to move therethrough for ejection by the spray nozzle. Another consideration is associated with the size of the spray nozzle. The size of the spray nozzle needed to optimally apply the cementitious composition to the substrate may depend on a size (length and thickness) of the fibers used in producing the cementitious composition. A further consideration is the viscosity of the cementitious composition. The viscosity of the composition is related to the amount of air pressure needed to optimally apply the cementitious composition to the substrate. However, despite certain additional considerations, the cementitious composition may be applied using conventionally known shotcrete sprayers, gunite sprayers, rotor-stator pumps and/or other generally accepted types of application devices known by those skilled in the art.

Optimal application of the cementitious composition is achieved by maintaining the application device (e.g. spray nozzle) at substantially 90 degree angle to the substrate to which the cementitious composition is being applied. Optimal application also may include using a high level of air pressure to apply the cementitious composition. An exemplary air pressure used in a spray applicator in applying the cementitious composition to a substrate may vary depending on the size and type of applicator used. As the air pressure used in applying the cementitious composition increases, the adhesion of the cementitious composition to the substrate increases.

Examples 3-8 below, illustrate various cementitious compositions made according to invention principles. Objects made from the cementitious compositions of the invention have higher strengths than traditional Shotcrete formulations while providing reduced health issues and enhanced workability to the applicator.

EXAMPLES

Example 1

A cementitious composition was made by pre-mixing 6 ounces (oz.) of superplasticizer with a quantity of water and separately mixing 6 oz. of shrinkage retarder with a quantity of water. Separately, 1.0 oz. of non-ionic surfactant was mixed with a quantity of water. Sixteen ounces of 8 mm length polyvinyl alcohol fiber was mixed and a quantity of water. Thus, the composition is formed from a total of 375 ounces of liquid ingredients. This includes 362 ounces of water and 13 ounces of chemical additives (superplasticizer, shrinkage retarder and non-ionic surfactant). Additionally, the quantities of water described above as being added at various stages (e.g. being pre-blended with each of the superplasticizer, shrinkage retarder and non-ionic surfactant or added to the fibers) need not be a specific amounts so long as the total amount of water equals 362 ounces bringing the total amount of liquid ingredients including the additives and water equal to 375 ounces. The liquid and fiber mixture was mixed with 90 pounds of cement/silica mixture. The ratio of cement to silica in the 90 pound mixture was 1:1. An additional 10 pounds of aggregate material was added. The 10 pounds of aggregate material included 40 oz. of vermiculite, 36 oz. of calcium alumina silica, 36 oz. of limestone and 24 oz. of Easy Spred. Each of the pre-mixtures of cement additives were then added (in any order) to the cement/aggregate mixture. The cementitious composition was mixed in a tumble mixer and sprayed directly onto the substrate using a rotor-stator pump and sprayer.

Example 2

A cementitious spray composition was made by pre-blending the following dry ingredients together: ninety pounds of cement and silica in a 1:1 ratio plus 92 oz. of calcium alumina silicate, 24 oz. of vermiculite, 12 oz. of ½" length acrylic fiber and 32 oz. of bentonite clay. A combination of chemical additives was also pre-blended with a quantity of water to produce the complex admixture. The complex admixture included 8 oz. of superplasticizer, 1.0 oz. of non-ionic surfactant and 12 oz. of shrinkage retarder. The complex admixture was combined with the dry ingredient pre-mixture and 354 ounces of water. Thus, the total amount of liquid ingredients (water plus complex admixture of the composition is 375 ounces. All ingredients were combined in a mortar mixer and mixed until ready to be sprayed. A gunite pump and sprayer were used for application.

Example 3

A cementitious composition was made by pre-mixing into a complex admixture 16 oz. of superplasticizer, 6 oz. of shrinkage reduction agent, and 0.2 oz. of non-ionic surfactant with a first quantity of water. Eight ounces of ½" length polypropylene fibers were then mixed with the complex admixture and a second quantity of water. The first and second quantity of water being equal to 352.8 ounces. Thus, the total amount of liquid ingredients (water plus complex admixture of the composition is 375 ounces. Additionally, the first quantity of water and the second quantity of water need not be a specific amount so long as the total amount of water equals 352.8 ounces bringing the total amount of liquid ingredients including the additives and water equal to 375 ounces. One hundred pounds of dry mix formed from a cement/aggregate mixture was added to the mixture of liquid ingredients and fibers and mixed in a planetary mixer. The dry mix included of 50 pounds of cement, 47 lbs. of silica, 32 oz. of vermiculite and 16 oz. of Easy Spred.

Example 4

A cementitious composition was made by pre-blending the following dry ingredients together to form a dry mix: 45 lbs. of cement, 50 lbs. of 60-80 grit silica, 24 oz. of bentonite clay, 24 oz. of limestone, 24 oz. of calcium alumina silicate, and 6 oz. of 1" basalt fiber and 6 oz. of 8 mm PVA fiber. Separately, a pre-mixture of cement additives were mixed by blending to produce a complex admixture. The complex admixture included 12 oz. of superplasticizer, 8 oz. of shrinkage reduction agent and 0.1 oz. of non-ionic surfactant and a first quantity of water. After the dry mix and the complex admixture were prepared, the two were combined with a second quantity of water. The first and second quantity of water is equal to 354.9 ounces. Thus, the total amount of liquid ingredients (water plus complex admixture of the composition is 375 ounces. Additionally, the first quantity of water and the second quantity of water need not be a specific amount so long as the total amount of water equals 354.9 ounces bringing the total amount of liquid ingredients including the additives and water equal to 375 ounces. All ingredients were then blended in a paddle mixer and then dumped into a hopper to feed a Shotcrete pump and spray unit.

Example 5

A cementitious spray composition was made by pouring two gallons of water into a tumble mixer. Six ounces of superplasticizer was added to the water. Twelve ounces of a shrinkage reduction agent was also added to the water along with 0.8 oz. of non-ionic surfactant. The liquid was mixed for 30 seconds. Forty pounds of cement was added to the mixer and the mixer was turned on. Fifty three pounds of silica was added to the mix followed by 16 oz. of calcium alumina silicate, 54 oz. of vermiculite, along with 30 oz. of limestone and 8 oz. of Easy Spred. All ingredients were mixed for approximately 2 minutes. Two oz. of 1" polyethylene fibers and 2 oz. of PVA fibers were added to the mixture and all ingredients were mixed for approximately 90 seconds prior to being added into a pump hopper to be applied by a spraying device.

Example 6

A cementitious composition was made by forming a complex admixture. The complex admixture is formed by pre-mixing 4 ounces (oz.) of superplasticizer with a first quantity of water and separately mixing 16 oz. of shrinkage retarder with a second quantity of water. Sixteen oz. of 8 mm length polyvinyl alcohol fiber was mixed with the complex admixture, a third quantity of water, 41 lbs of cement and 55 lbs of silica. The total of the first, second and third quantities of water are equal to 355 ounces. Thus, the total amount of liquid ingredients (water plus complex admixture of the composition is 375 ounces. Additionally, the first quantity of water, the second quantity of water and/or the third quantity of water need not be a specific amount so long as the total amount of water equals 355 ounces bringing the total amount of liquid ingredients including the additives and water equal to 375 ounces. An additional 4 lbs of aggregate was added. The additional 4 lbs of aggregate included 16 oz. of vermiculite, 16 oz. of calcium alumina silica, and 24 oz. of limestone and 24 oz. The complex admixture of cement additives was then added to the cement/aggregate mixture. The cementitious composition was mixed in a tumble mixer and sprayed directly onto the substrate using a rotor-stator pump and sprayer.

It is important to note that the description of the total quantity of water listed in Examples 1-6 is described for purposes of example only and that the total quantity of water may be either reduced or increased due to at least one external environmental factor. Exemplary external environmental factors that may require the adjustment of total water quantity used to produce the cementitious compositions may include at least one (a) temperature, (b)_humidity and (c) sunlight and the like. Persons skilled in the art of mixing cementitious compositions would be readily able to adapt mixing times and water quantities depending on the external factors present at the time the composition is being produced.

While in the foregoing specifications this invention has been described in relation to certain preferred embodiments thereof, and many details have been set forth for the purpose of illustration, it will become apparent to those skilled in the art that the invention is susceptible to additional embodiments and that certain of the details described herein can be varied considerably without departing from the basic principles of the invention. Therefore, to particularly point out and distinctly claim the subject matter regarded as the invention, the following claims conclude the specification.

What is claimed is:

1. A cementitious composition, comprising:
    a dry mix having a total weight of substantially 100 pounds, the dry mix including
        a quantity of cement;
        a quantity of silica;
        a plurality of fibers;
    a quantity of water in an amount up to four gallons per 100 pounds dry mix;
    between 4 ounces and 14 ounces of superplasticizer per 100 pounds of dry mix; and
    between 2 ounces and 16 ounces of shrinkage reduction agent per 100 pounds of
dry mix; and
    between 0.1 ounce and 2 ounces of non-ionic surfactant per 100 pounds of dry mix.

2. The cementitious composition of claim 1, wherein the plurality of fibers includes at least one of (a) polypropylene; (b) polyethylene; (c) polyvinyl alcohol; (d) acrylic; and (e) basalt.

3. The cementitious composition of claim 1, wherein the plurality of fibers
    comprises substantially 16 ounces of one or more fibers having a length ranging from substantially 6 mm to substantially 1.5" per 100 pounds of dry mix.

4. The cementitious composition of claim 1, further comprising between 0.5 quart and 3 quarts of accelerator per 100 pounds of dry mix.

5. The cementitious composition of claim 1, further comprising
    at least one chemical additive, the at least one chemical additive_including at least one of (a) a set accelerator; (b) an air entraining agent; (c) a water reducer; (d) a viscosity control agent; and (e) an anti-bleed/anti-segregation agent.

6. The cementitious composition of claim 1, wherein the dry mix further includes at least one of (a) vermiculite; (b) bentonite clay; (c) limestone; (d) calcium alumina silicate: (e) metakaolin; and (f) silica fume.

7. The cementitious composition of claim 1, further comprising a dye.

8. A cementitious composition, comprising:
    a dry mix having a total weight of substantially 100 pounds, the dry mix including
        a quantity of cement;
        a quantity of silica;
        a plurality of fibers;
    a quantity of water in an amount up to 4 gallons per 100 pounds of dry mix;
    between 8 ounces and 20 ounces of superplasticizer per 100 pounds of dry mix; and
    between 6 ounces and 12 ounces of shrinkage reduction agent per 100 pounds of dry mix; and
    a quantity of non-ionic surfactant in an amount up to 0.6 ounces per 100 pounds of dry mix.

9. The cementitious composition of claim 8, wherein the plurality of fibers includes at least one of (a) polypropylene; (b) polyethylene; (c) polyvinyl alcohol; (d) acrylic; and (e) basalt.

10. The cementitious composition of claim 8, wherein the plurality of fibers comprises substantially 16 ounces of one or more fibers having a length ranging from substantially 6 mm to substantially 1.5" per 100 pounds of dry mix.

11. The cementitious composition of claim 8, further comprising between 0.5 quart and 3 quarts of accelerator per 100 pounds of dry mix.

12. The cementitious composition of claim 8, further comprising at least one chemical additive, the at least one chemical additive including at least one of (a) a set accelerator; (b) an air entraining agent; (c) a water reducer; (d) a viscosity control agent; and (e) an anti-bleed/anti-segregation agent.

13. The cementitious composition of claim 8, wherein the dry mix further includes at least one of (a) vermiculite; (b) bentonite clay; (c) limestone; (d) calcium alumina silicate: (e) metakaolin; and (f) silica fume.

14. The cementitious composition of claim 8, further comprising a dye.

\* \* \* \* \*